United States Patent [19]
Abe et al.

[11] Patent Number: 6,147,942
[45] Date of Patent: Nov. 14, 2000

[54] FOCUS CONTROL APPARATUS FOR MULTILAYER OPTICAL RECORDING MEDIUM

[75] Inventors: Hiroyuki Abe; Takeshi Sato; Kazushige Kawana; Hideaki Watarihana; Shinichi Naohara; Motoi Kimura; Yuichi Kimikawa; Masakazu Takahashi, all of Kawagoe, Japan

[73] Assignee: Pioneer Corporation, Tokyo, Japan

[21] Appl. No.: 09/112,004

[22] Filed: Jul. 8, 1998

[30] Foreign Application Priority Data

Jul. 15, 1997 [JP] Japan ................................. 9-189533

[51] Int. Cl.[7] ................................................ G11B 7/00
[52] U.S. Cl. .............................. 369/44.27; 369/94
[58] Field of Search .................. 369/44.25, 44.26–44.27, 369/48, 54, 94

[56] References Cited

U.S. PATENT DOCUMENTS 5,491,677  2/1996  Sasaki et al. ..................... 369/54 X
5,568,461  10/1996  Nishiuchi et al. ............... 369/44.26 X
5,612,939  3/1997  Ueki et al. ........................ 369/48
5,740,136  4/1998  Tsutsui et al. ................... 369/44.25

*Primary Examiner*—Aristotelis M. Psitos
*Attorney, Agent, or Firm*—Sughrue, Mion, Zinn, Macpeak & Seas, PLLC

[57] ABSTRACT

A focus control apparatus for a multilayer optical recording medium which performs an appropriate focus jump on a multilayer optical recording medium. This focus control apparatus implements such focus jump control as to temporarily release a focus servo on one layer of a loaded multilayer optical recording medium, shift the focus position of read light on another target layer and then restart the focus servo on the another target layer, detects an ambient temperature, sets a drive signal condition according to the temperature detection output, and moves the focus position of the read light under the set drive signal condition. Specifically, this apparatus generates an acceleration signal to start moving the focus position of read light and a deceleration signal to decelerate movement of the focus position of the read light, as drive signals for a focus actuator in order to execute a focus jump operation, detects an ambient temperature of the focus actuator, and sets signal conditions for the acceleration signal and the deceleration signal according to the detected temperature.

5 Claims, 13 Drawing Sheets

FIG. 6

| TEMPERATURE T (°C) | KICK PULSE WIDTH $t_K$ | BRAKE PULSE WIDTH $t_B$ | KICK PULSE AMPLITUDE $V_K$ | BRAKE PULSE AMPLITUDE $V_B$ | TIME TO GENERATION OF BRAKE PULSE $t_x$ |
|---|---|---|---|---|---|
| T < 0 | $t_{K1}$ | $t_{B1}$ | $V_{K1}$ | $V_{B1}$ | $t_{x1}$ |
| 0 ≦ T < 10 | $t_{K2}$ | $t_{B2}$ | $V_{K2}$ | $V_{B2}$ | $t_{x2}$ |
| 10 ≦ T < 20 | $t_{K3}$ | $t_{B3}$ | $V_{K3}$ | $V_{B3}$ | $t_{x3}$ |
| 20 ≦ T < 30 | $t_{K4}$ | $t_{B4}$ | $V_{K4}$ | $V_{B4}$ | $t_{x4}$ |
| 30 ≦ T < 40 | $t_{K5}$ | $t_{B5}$ | $V_{K5}$ | $V_{B5}$ | $t_{x5}$ |
| 40 ≦ T < 50 | $t_{K6}$ | $t_{B6}$ | $V_{K6}$ | $V_{B6}$ | $t_{x6}$ |
| T ≧ 50 | $t_{K7}$ | $t_{B7}$ | $V_{K7}$ | $V_{B7}$ | $t_{x7}$ |

FOCUS CONTROL APPARATUS FOR MULTILAYER OPTICAL RECORDING MEDIUM

BACKGROUND OF THE INVENTION

1. Field of the Invention

The present invention relates to a focus control apparatus provided in a reproduction apparatus which reproduces data from a multilayer optical recording medium.

2. Description of Related Art

One way to improve the recording density of a disk is multiplexing of information in a direction perpendicular to the disk's surface. A multilayer optical disk is capable of implementing such perpendicularly multiplexed information recording. With a double-layer optical disk in use, for example, first and second layers are formed with a spacer region in between as shown in FIG. 1, and the first layer closer to the light irradiated surface of the disk is made translucent so that light reaches the second layer.

In reproduction of such a multilayer optical disk, changing the layer from which recorded information is to be read requires that a focus control apparatus should carry out a focus jump operation to rapidly focus read light on the next reading layer.

Normally, the focus jump operation to shift the focal point of read light from the information recorded surface on one layer to the information recorded surface on another is executed based on zero-crossing detection of a focus error signal which is generated based on the output of a pickup.

Specifically, the pickup is provided with a focus actuator, a read-light emitting optical system, for example, which moves an objective lens for determining the focal point of the optical system along the optical axis to thereby shift the focal point of the read light in a direction perpendicular to the surface of the disk. In the initial stage of the focus jump operation, this focus actuator is supplied with an acceleration signal or a focus jump enable signal to shift the focal point of the read light to a target recording surface. Based on the timing of zero-crossing which is detected one after another from a focus error signal acquired during displacement of the focus actuator that is implemented in response to the acceleration signal, a series of operations of terminating the supply of the acceleration signal, supplying a deceleration signal to the focus actuator to stop the displacement of the focus actuator that has taken place in response to the acceleration signal or stopping supplying the deceleration signal and restarting focus servo on the target recording surface.

The focus actuator of a focus control apparatus, like that in a reproduction apparatus for ordinary optical disks, is affected by the ambient temperature. In a focus jump operation conducted by the above-described focus control apparatus for a multilayer optical disk, therefore, the focus position of read light may not be shifted properly to the recording surface of a target layer due to the influence of the ambient temperature on the focus actuator. When the ambient temperature is high, for example, the moving distance of the focus actuator becomes too short for the focus position to reach the target layer even with the use of the same acceleration signal and deceleration signal as generated at the normal temperature. When the ambient temperature is low, on the other hand, even the same acceleration signal and deceleration signal as generated at the normal temperature increase the amount of overshooting of the focal point of read light from the recording surface of the target layer so that the focus position jumps over the target layer.

OBJECTS AND SUMMARY OF THE INVENTION

Accordingly, it is an objective of the present invention to provide a focus control apparatus for a multilayer optical recording medium, which can adequately perform a focus jump on a multilayer optical recording medium.

According to one aspect of this invention, a focus control apparatus for a multilayer optical recording medium for implementing such focus jump control as to temporarily release a focus servo on one layer of a loaded multilayer optical recording medium, shift a focus position of read light on another target layer and then restart the focus servo on the another target layer, comprises temperature detection means for detecting an ambient temperature; and control means for setting a drive signal condition according to a temperature detection output of the temperature detection means and moving the focus position of the read light under the set drive signal condition.

According to another aspect of this invention, a focus control apparatus for a multilayer optical recording medium for generating an acceleration signal to start moving a focus position of read light and a deceleration signal to decelerate movement of the focus position of the read light, as drive signals for a focus actuator in order to execute a focus jump operation to irradiate the read light onto a recording medium having information recording surfaces on at least two layers formed perpendicular to a surface of the recording medium and loaded in a reproduction apparatus for reproducing data from the recording medium, and to shift the focus position of the read light from the recording surface of one of the at least two layers to the recording surface of another layer based on a focus error signal to be generated on a basis of return light of the read light from the recording medium, comprises temperature detection means for detecting an ambient temperature of the focus actuator; and setting means for setting signal conditions for the acceleration signal and the deceleration signal according to a temperature detection output of the temperature detection means.

BRIEF DESCRIPTION OF THE DRAWINGS

FIG. 6 is a diagram depicting a reference table;

DETAILED DESCRIPTION OF THE PREFERRED EMBODIMENT

A preferred embodiment of the present invention will now be described in detail referring to the accompanying drawings.

Figure 2:
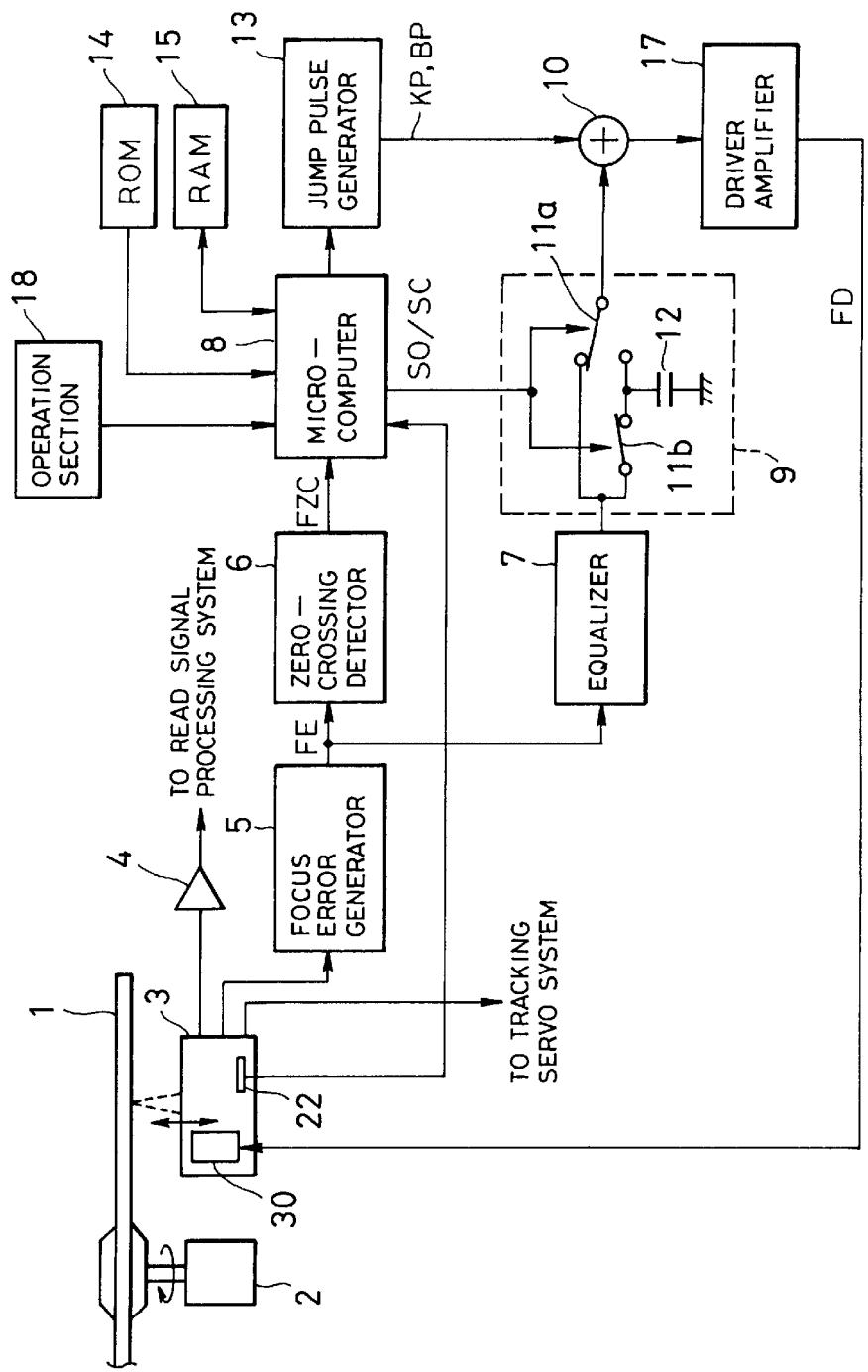
FIG. 2 is a block diagram depicting the constitution of a focus control apparatus according to this invention.

FIG. 2 shows the schematic constitution of a double-layer optical disk player which uses a focus control apparatus according to one embodiment of this invention.

Figure 1:
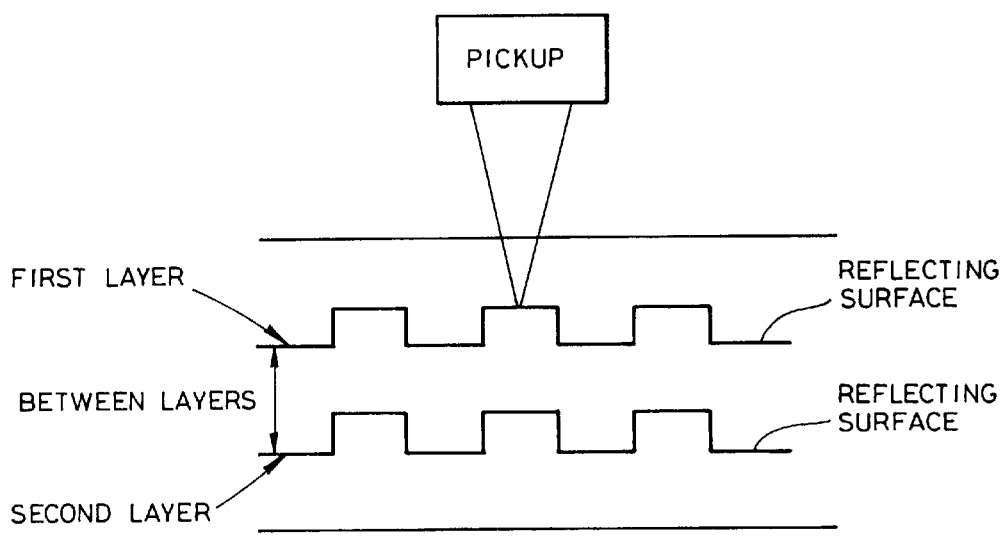
FIG. 1 is a diagram showing the cross section of a double-layer optical disk.

Referring to FIG. 2, a disk 1 loaded in the player is a double-layer optical disk shown in FIG. 1, is spun by a spindle motor 2 and is irradiated with read light which is produced by a pickup 3. This read light reaches the recording surface (reflection surface) of a first layer or a second layer through a protection layer of the disk 1, and is modulated with so-called recorded marks which carry recorded information, such as pits formed on the recording surface. The modulated light becomes reflected light from the recording surface and returns to the pickup 3.

The pickup 3 not only generates the read light but also receives the reflected light from the disk 1 and performs photoelectric conversion to generate various kinds of electric signals according to the amount and/or the status of the reflected light. Of the electric signals generated by the pickup 3, a read signal mainly having a signal component according to recorded information on the disk 1 (so-called an RF (Radio Frequency) signal) is amplified by an RF amplifier 4 and is then transferred to an unillustrated read signal processing system. The read signal processing system reproduces a final audio or video signal or a computer data signal from the RF signal, and sends the reproduced signal outside the player, for example.

A focus error generator 5 generates a focus error signal FE representing a focus error of the read light with respect to the recording surface, based on another electric signal generated by the pickup 3. A further electric signal generated by the pickup 3 is supplied to an unillustrated tracking servo system. Based on this electric signal, the tracking servo system generates a tracking error signal according to which the irradiation position of the read light is so controlled as to coincide with the center of a recording track of the disk 1.

One way of generating the focus error signal is to let the reflected light from the disk pass through a cylindrical lens as the light receiving system of the pickup 3 to thereby impart astigmatism to the reflected light and allow the resultant reflected light to be received by a 1/4 photodetector. The light-receiving surface of the 1/4 photodetector has four light-receiving portions separated by two lines perpendicularly crossing at the light reception center. As the receiving reflected light changes its shape and intensity at the light-receiving surface according to the focus status of the read light on the recording surface of the disk, photoelectrically converted signals from the light-receiving portions, located point symmetrical to one another with respect to the light reception center, are added together, yielding two added signals. A signal representing a difference between those two added signals is output as a focus error signal.

In an example of embodiment in which a read signal is generated, with the 1/4 photodetector in use, a read signal can be acquired from the sum of the photoelectrically converted signals from all the light-receiving portions or may be obtained from another detector.

Figure 3:
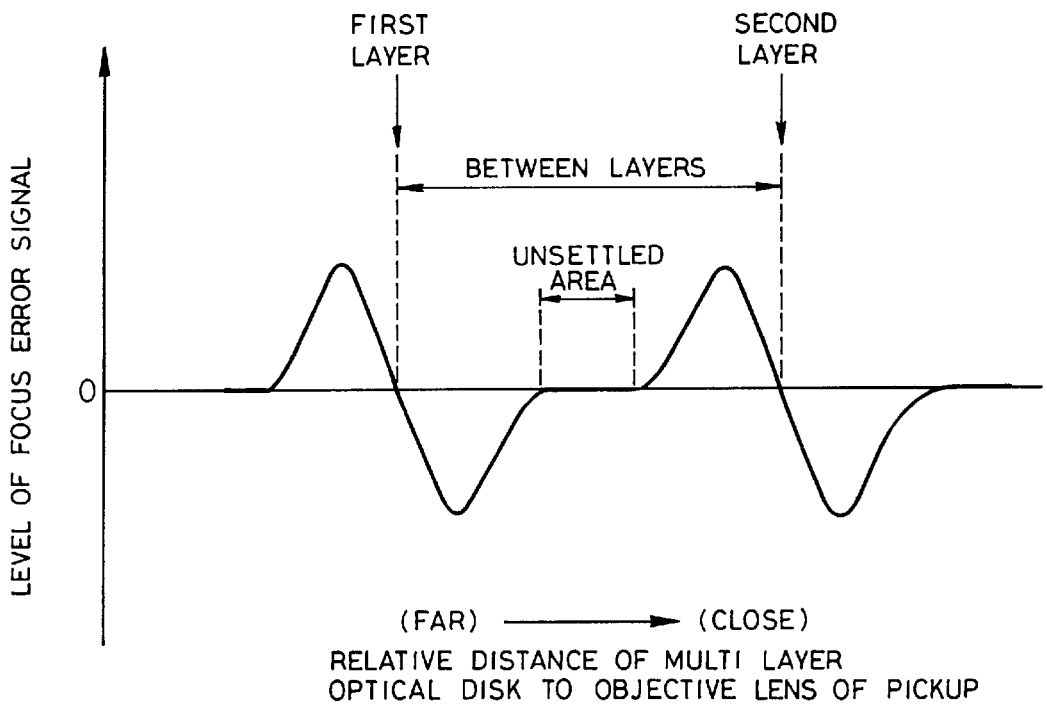
FIG. 3 is a diagram illustrating the change characteristic of a focus error signal in a focus jump.

The focus error signal has a zero level when the relative distance of the objective lens of the pickup 3 to each of the first and second layers is a reference value, has such an S-shaped characteristic that the output level continuously changes according to a shift from the reference value, and the focus error signals of the individual layers have the opposite polarities between the adjoining first and second layers, as shown in FIG. 3. In a midway between the layers lies an unsettled area where no focus error signal is obtained.

Methods of generating a tracking error signal include a 3-beam method, a phase difference method and a push-pull method, the latter two for a case where a tracking error is provided by a single light beam.

The pickup 3 incorporates a focus actuator 30 which moves, along the optical axis, the objective lens for irradiating the read light, emitted from the light source, onto the disk 1. The focus actuator 30 shifts the objective lens perpendicular to the surface of the disk 1 in accordance with the level and polarity of a drive signal to be discussed later.

The output of the focus error generator 5 is connected to a zero-crossing detector 6 and an equalizer 7. The zero-crossing detector 6 detects that the level of the focus error signal FE output from the focus error generator 5 passes two threshold values $\pm V_{TH}$ close to the zero level, generates a zero-crossing detection signal FZC corresponding to the detection result, and sends the signal FZC to a microcomputer 8. The equalizer 7 performs a process like wave equalization to the supplied focus error signal FE and sends the equalized focus error signal to an adder 10 via a hold circuit 9.

The hold circuit 9 has a changeover switch 11a, an ON/OFF switch 11b and a capacitor 12. When the ON/OFF switch 11b is on, the output signal of the equalizer 7 is supplied via the ON/OFF switch 11b to the capacitor 12 and stored there. The ON/OFF switch 11b is a unidirectional switch element like a transistor, so that no current flows through the ON/OFF switch 11b from the capacitor 12. The changeover switch 11a selectively sends either the output signal of the equalizer 7 or the stored voltage in the capacitor 12 to the adder 10. In a focus servo mode, the microcomputer 8 sets the changeover switch 11a to the equalizer 7 side and sets the ON/OFF switch 11b on.

Based on the zero-crossing detection signal FZC, the microcomputer 8 generates a kick pulse generation signal for accelerating and shifting the focus actuator 30 in a predetermined direction, a kick pulse stop signal, a brake pulse generation signal for decelerating the focus actuator 30, which is in motion in response to the kick pulse, and stopping the displacement of the focus actuator 30 in the predetermined direction, and a brake pulse stop signal. Those instruction signals are supplied to a jump pulse generator 13.

Figure 4:
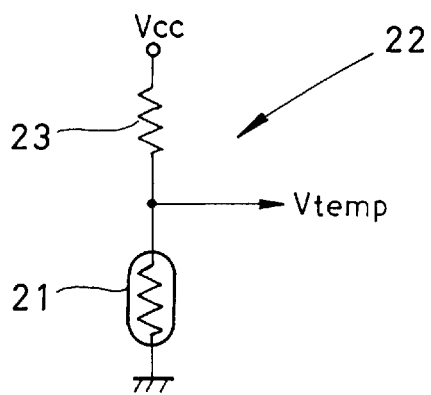
FIG. 4 is a circuit diagram showing the constitution of a temperature detector.
Figure 5:
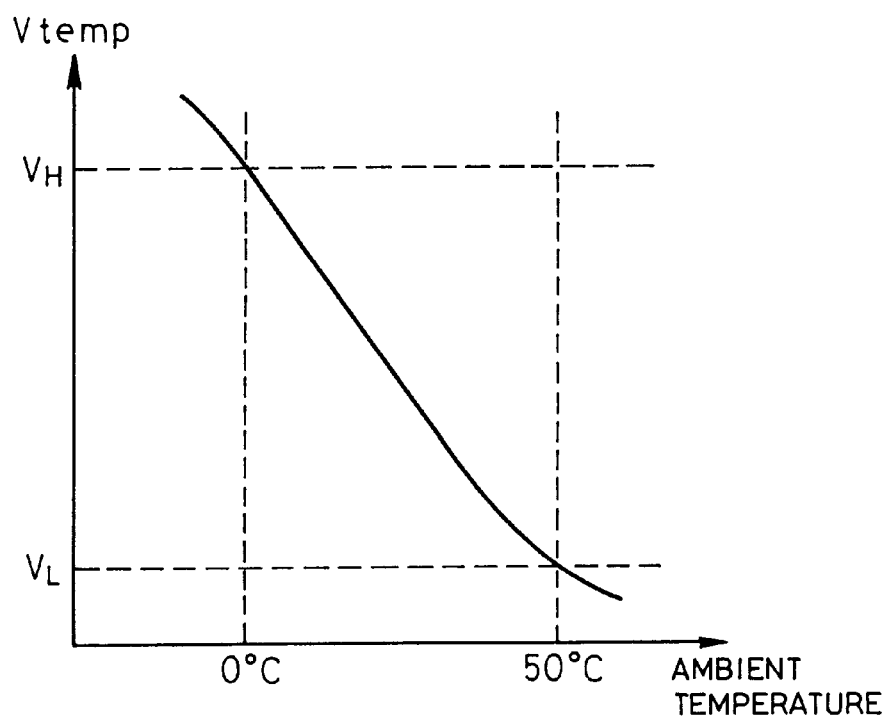
FIG. 5 is a diagram showing the detection characteristic of the temperature detector.

Connected to the microcomputer 8 is a temperature detector 22 which detects the ambient temperature of the player. The temperature detector 22 is comprised of a thermistor 21 and a resistor 23, as shown in FIG. 4. The thermistor 21 is located inside or around the pickup 3. As a predetermined voltage $V_{CC}$ is applied via the resistor 23 to the thermistor 21, the resistance of the thermistor 21 becomes a value according to the temperature inside the pickup 3 so that the temperature inside the pickup 3 is detected as a voltage acquired by dividing the voltage $V_{CC}$ by the resistor 23 and the resistor of the thermistor 21. FIG. 5 depicts the detection characteristic which shows the relationship between the detected voltage $V_{temp}$ of the temperature detector 22 and the ambient temperature T. The thermistor 21 should not necessarily be located inside the pickup 3, but may be provided alone in the vicinity of the disk 1.

Further connected to the microcomputer 8 are a ROM 14 and RAM 15. A reference table has previously been written in the ROM 14. As shown in FIG. 6, the reference table shows the width $t_K$ of the kick pulse, the width $t_B$ of the brake pulse, the amplitude $V_K$ of the kick pulse, the amplitude $V_B$ of the brake pulse, and a time $t_X$ from the point of generation of the kick pulse to the point of generation of the brake pulse. Data which is being processed by the microcomputer 8 is stored in the RAM 15.

The jump pulse generator 13 produces a jump pulse, which consists of a kick pulse KP and brake pulse BP, in accordance with a pulse generation signal and a pulse stop signal from the microcomputer 8, and gives associated polarities to the kick pulse KP and brake pulse BP. The output of the jump pulse generator 13 is connected to the adder 10.

The adder 10 adds the signal from the hold circuit 9 and the jump pulse from the jump pulse generator 13, and sends the addition result to a driver amplifier 17. The driver amplifier 17 generates a drive signal according to the output of the adder 10, and sends the drive signal to the focus actuator 30.

Figure 7:
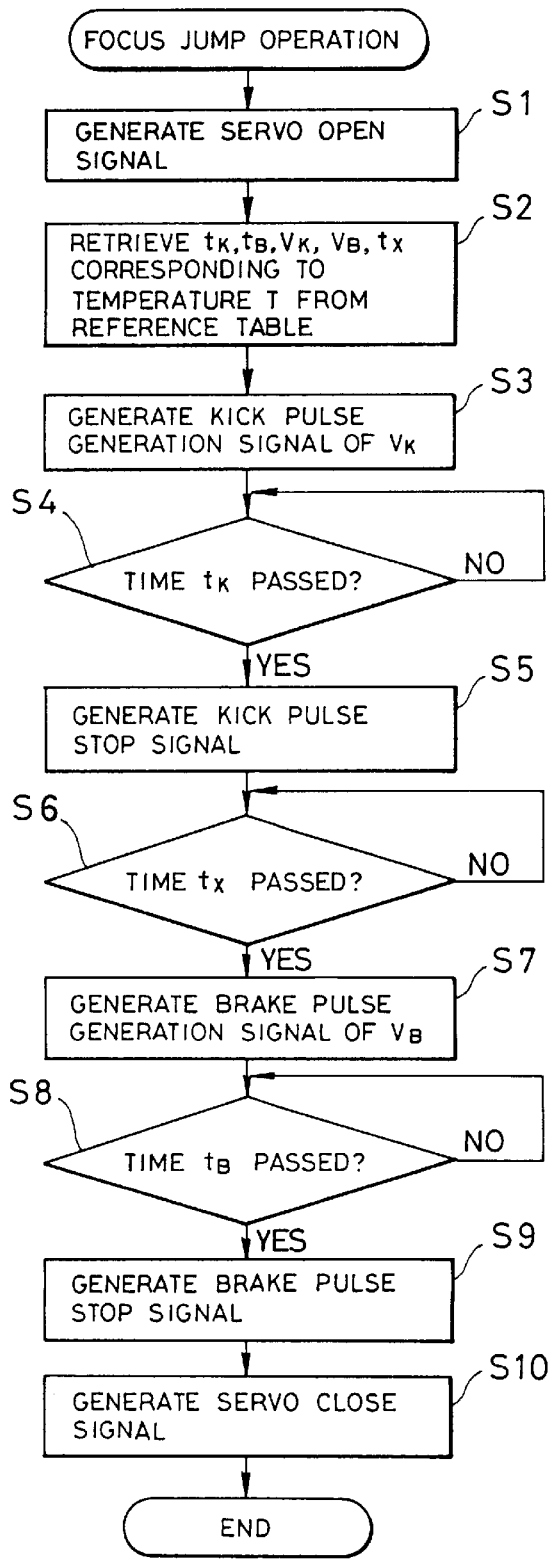
FIG. 7 is a flowchart illustrating a focus jump operation.

Upon reception from an operation section 18 of a focus jump signal for moving the focus position of read light to the recording surface of another layer, the microcomputer 8 interrupts the process that has been undergoing, and starts a focus jump operation illustrated in FIG. 7. In this focus jump operation the focus position is to be shifted from the recording surface of the first layer to the recording surface of the second layer.

Figure 8A:
FIGS. 8A through 8D are waveform charts illustrating the focus jump operation.
Figure 8B:

When receiving the focus jump signal as shown in FIG. 8A, the microcomputer 8 generates a servo open signal SO (step S1). The servo open signal switches the changeover switch 11a of the hold circuit 9 over to the capacitor 12 side and sets the ON/OFF switch 11b off. This renders the focus servo system off as shown in FIG. 8B. Consequently, the storage level of the capacitor 12 of the hold circuit 9 or the level of the focus error signal immediately before the OFF state is held and is output to the adder 10. The microcomputer 8 searches the reference table in the ROM 14 for the width $t_K$ of the kick pulse, the width $t_B$ of the brake pulse, the amplitude $V_K$ of the kick pulse, the amplitude $V_B$ of the brake pulse, and the time $t_X$ corresponding to the present ambient temperature T (step S2), generates the kick pulse generation signal of the voltage $V_K$ (step S3), and determines if the time $t_K$ has passed since the generation of the kick pulse generation signal (step S4). If the time $t_K$ has passed, the kick pulse stop signal is produced (step S5).

Figure 8C:
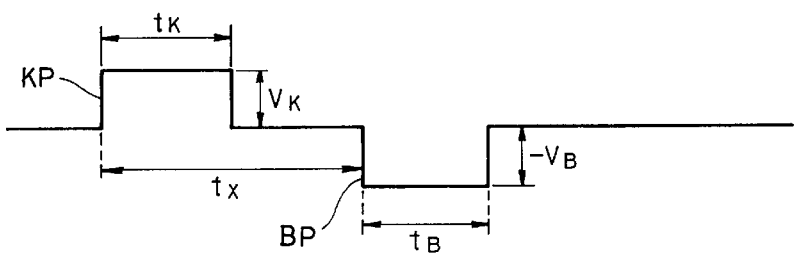
Figure 8D:
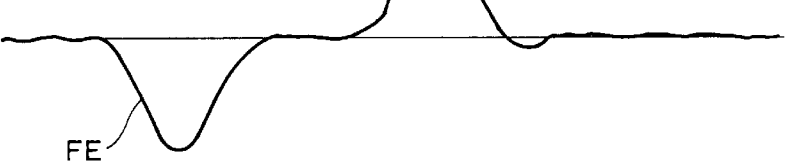

In accordance with the kick pulse generation signal and the kick pulse stop signal, the jump pulse generator 13 generates a kick pulse of the voltage $V_K$ and the sustain duration $t_K$ as shown in FIG. 8C. The kick pulse is supplied to the adder 10. The adder 10 adds the positive level $V_K$ of the kick pulse and the held level output from the hold circuit 9 together and the drive signal FD corresponding to the addition result is supplied to the focus actuator 30 from the driver amplifier 17. During the generation period of the kick pulse, therefore, the actuator 30 is forcibly accelerated in a direction in which the focus position of read light is moved to a new target recording surface. Accordingly, as the focus position of the read light moves away from the followed-up recording surface, the level of the focus error signal FE which has been nearly zero so far changes in such a valley-like form that the level becomes larger on the negative side and returns to the zero level again after reaching the negative peak, as shown in FIG. 8D.

After generation of the kick pulse is stopped, the moment of inertia originated in response to the kick pulse causes the focus actuator 30 to keep moving to shift the focus position of the read light toward the recording surface of the second recording layer while slowing down its speed. During the movement of the focus actuator 30, the focus error signal FE returns to nearly the zero level, then reaches the unsettled area, after which the second layer will exercise an influence on the focus error signal FE as the focus actuator 30 moves further. That is, the level of the focus error signal FE changes in such a valley-like form that the level gradually becomes larger on the positive side due to the influence of the second layer, reaches a positive peak and then returns to the zero level, as shown in FIG. 8D.

After executing step S5, the microcomputer 8 determines if the time $t_X$ has passed since the generation of the kick pulse generation signal (step S6). When the time $t_X$ has passed, the microcomputer 8 generates the brake pulse generation signal of the voltage $V_B$ (step S7). The microcomputer 8 then determines if the time $t_B$ has passed since the generation of the brake pulse generation signal (step S8). When the time $t_B$ has passed, the microcomputer 8 generates the brake pulse stop signal (step S9).

In accordance with the brake pulse generation signal and the brake pulse stop signal, the jump pulse generator 13 generates the kick pulse of the voltage $-V_B$ and the sustain duration $t_B$ as shown in FIG. 8C and sends the brake pulse to the adder 10. The adder 10 adds the negative level $-V_B$ of the brake pulse and the held level output from the hold circuit 9 together and sends the addition result to the driver amplifier 17. Consequently, the drive signal FD for stopping the movement of the focus position of the read light to the recording surface of the second layer is supplied to the focus actuator 30, which in turn gradually slows down the displacement speed. That is, the kick pulse having the pulse width and amplitude according to the ambient temperature T is generated, followed by the generation of the brake pulse whose pulse width and amplitude correspond to the ambient temperature T at the timing corresponding to the ambient temperature T. The focus position of the read light therefore reaches the recording surface of the second layer at the proper timing without hardly overshooting.

After executing step S9, the microcomputer 8 generates a servo close signal SC (step S10). The servo close signal SC switches the changeover switch 11a of the hold circuit 9 over to the equalizer 7 side and sets the ON/OFF switch 11b on. This causes the focus error signal FE to be supplied via the equalizer 7 and the adder 10 to the driver amplifier 17, after which the focus actuator 30 carries out the normal focus servo operation to permit the focus position of the read light to follow up the target recording surface of the second layer, based on the focus error signal FE.

As the focus jump operation ends, the microcomputer 8 goes to, for example, a mode for reproducing recorded information from the recording surface of the second layer.

Figure 9:
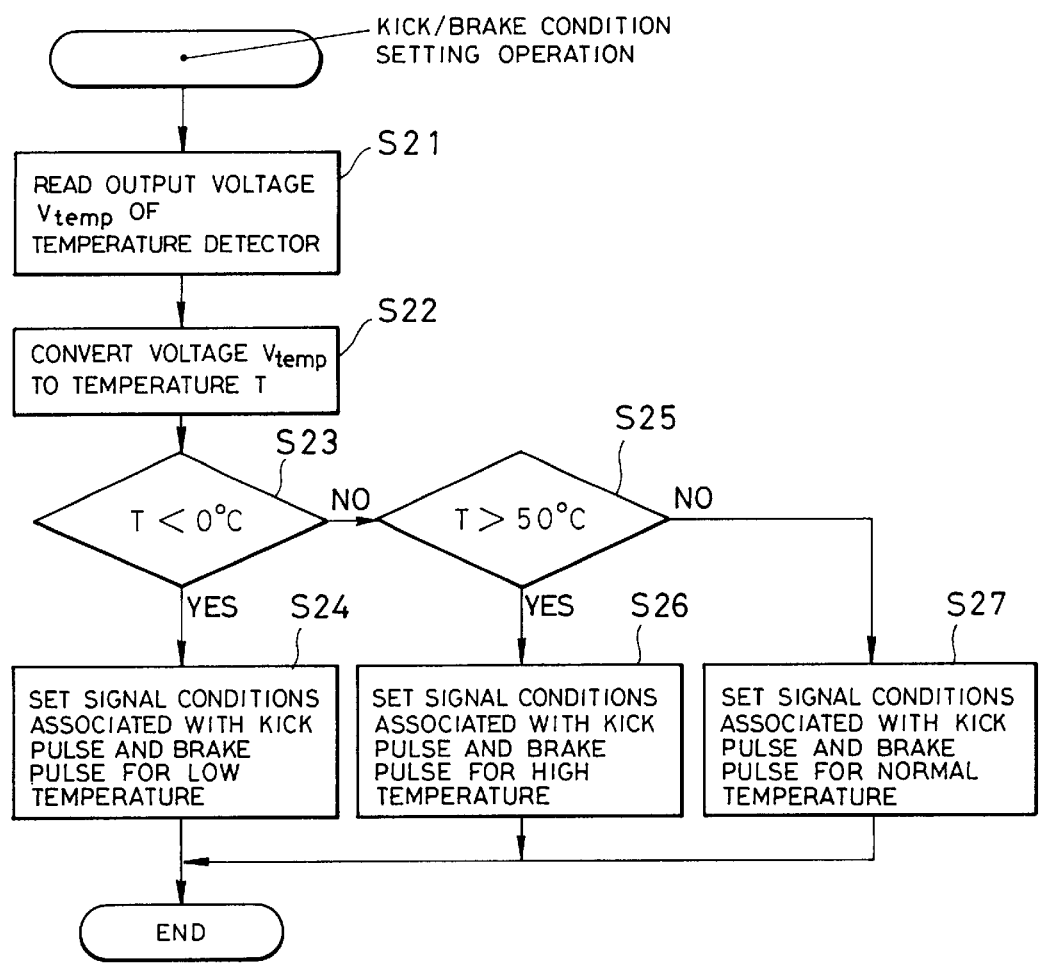
FIG. 9 is a flowchart showing a kick/brake condition setting operation.

In the focus jump operation shown in FIG. 7, the width $t_K$ of the kick pulse, the width $t_B$ of the brake pulse, the amplitude $V_K$ of the kick pulse, the amplitude $V_B$ of the brake pulse, and the time $t_X$ to the generation of the brake pulse, which are signal conditions associated with the kick pulse and jump pulse corresponding to the ambient temperature T, are retrieved from the reference table. Specifically, a kick/brake condition setting operation as shown in FIG. 9 is executed by the microcomputer 8. More specifically, the microcomputer 8 reads the output voltage $V_{temp}$ of the temperature detector 22 (step S21), converts the read voltage $V_{temp}$ to a temperature T according to the detection characteristic shown in FIG. 5 (step S22), and determines if the temperature T is lower than 0° C. (step S23). When T<0° C., the signal conditions associated with the kick pulse and the brake pulse are set for a low temperature (steps S24). When T≧0° C., it is determined if the temperature T is higher than 50° C. (step S25). When T>50° C., the signal conditions associated with the kick pulse and the brake pulse are set for a high temperature (steps S26). When T≦50° C., the signal conditions associated with the kick pulse and the brake pulse are set for the normal temperature (steps S27).

Although the signal conditions associated with the kick pulse and the brake pulse are set for one of a low temperature, a high temperature and the normal temperature in the kick/brake condition setting operation in FIG. 9, the conditions may be set finely as given in the reference table depicted in FIG. 6.

Figure 10:
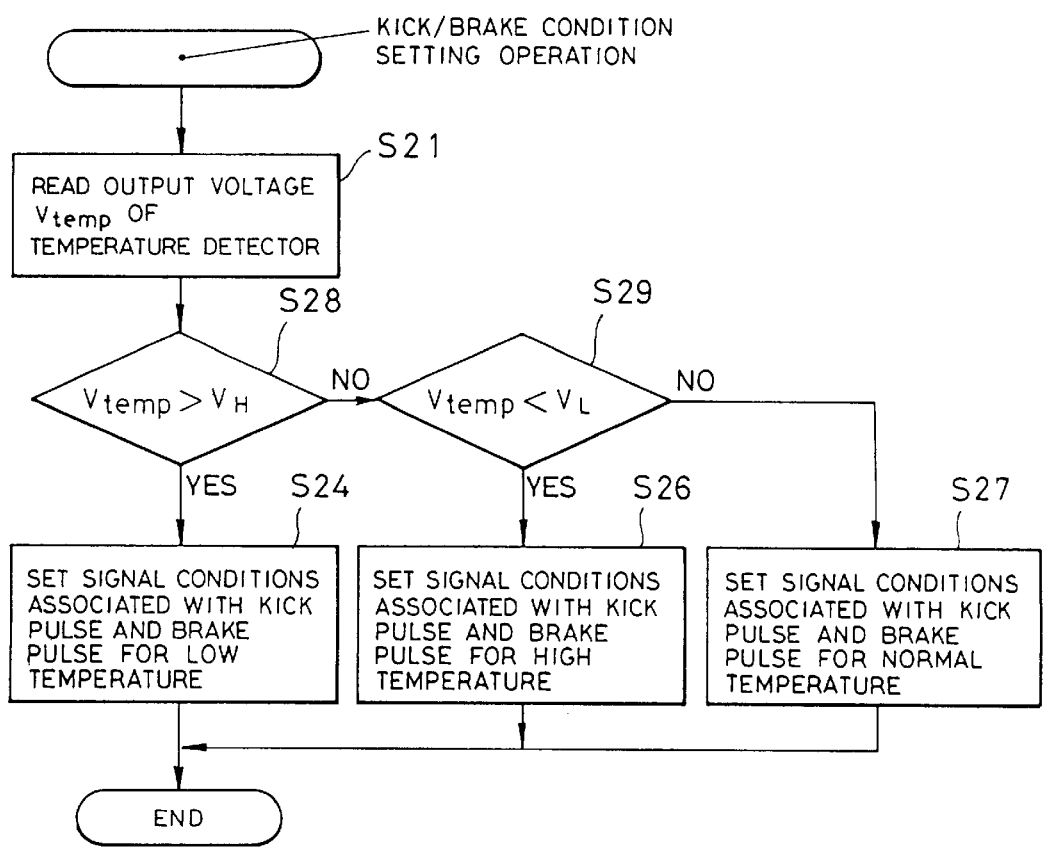
FIG. 10 is a flowchart showing another kick/brake condition setting operation.

While the read voltage $V_{temp}$ is converted to the temperature T which is in turn compared with 0° C. and 50° C. in steps S22, S23 and S25 in the kick/brake condition setting operation in FIG. 9, the voltage $V_{temp}$ may be compared directly with voltages corresponding to 0° C. and 50° C. As apparent from FIG. 5, because 0° C. and 50° C. respectively correspond to voltages $V_H$ and $V_L$ in the detection characteristic, the read $V_{temp}$ may be compared with $V_H$ and $V_L$ and the signal conditions associated with the kick pulse and the brake pulse may be set in accordance with the comparison results as indicated in steps S28 and S29 in FIG. 10.

Figure 11:
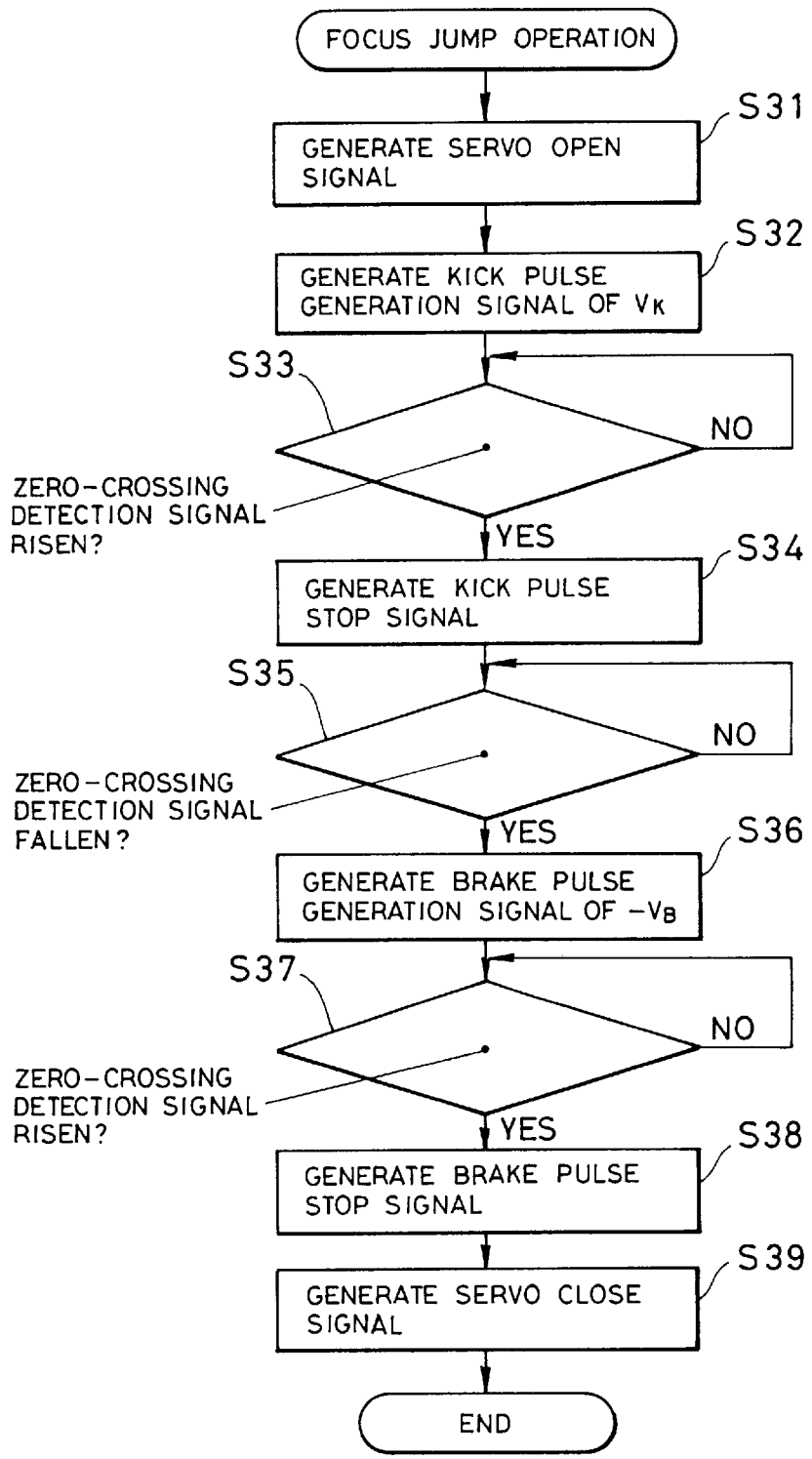
FIG. 11 is a flowchart illustrating another focus jump operation.
Figures 12A, 12B, 12C, 12D:
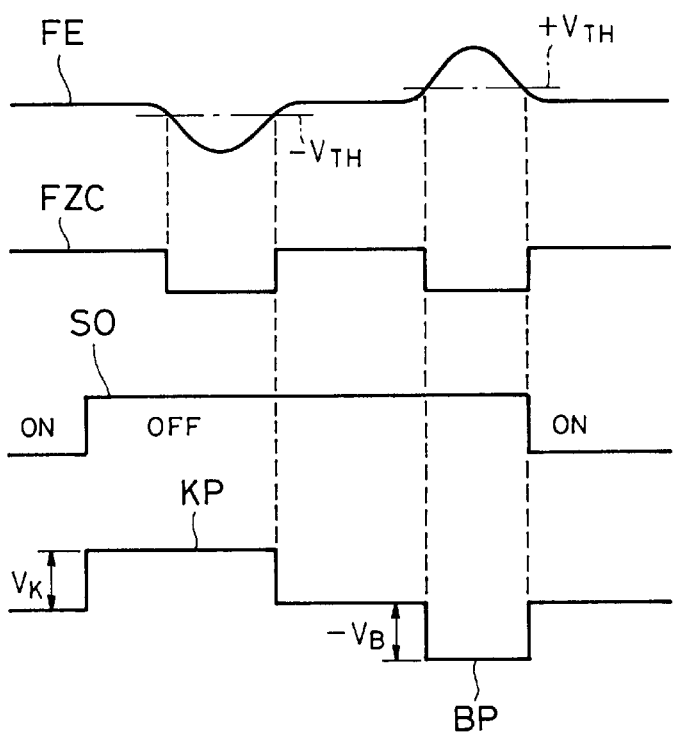
FIGS. 12A through 12D are waveform charts illustrating the focus jump operation in FIG. 11.

FIG. 11 illustrates another focus jump operation, which partially overlaps the focus jump operation in FIG. 7. A description will now be given of the focus jump operation in FIG. 11 including the overlapping portions. In this focus jump operation, first, the servo open signal SO is generated (step S31). The servo open signal changes the changeover switch 11a of the hold circuit 9 over to the capacitor 12 side and sets the ON/OFF switch 11b off. This renders the focus servo system off as shown in FIG. 12C. As a result, the storage level of the capacitor 12 of the hold circuit 9 or the level of the focus error signal immediately before the OFF state is held and is output to the adder 10. The microcomputer 8 generates the kick pulse generation signal of the voltage $V_K$ according to the ambient temperature T (step S32). In accordance with the kick pulse generation signal, the jump pulse generator 13 generates the kick pulse of the voltage $V_K$ as shown in FIG. 12D to the adder 10. The adder 10 adds the level of the voltage $V_K$ of the kick pulse and the held level output from the hold circuit 9 together and the drive signal FD corresponding to the addition result is supplied to the focus actuator 30 from the driver amplifier 17. During the generation period of the kick pulse, therefore, the actuator 30 is forcibly accelerated in a direction in which the focus position of read light is moved to a new target recording surface. Accordingly, as the focus position of the read light moves away from the followed-up recording surface, the level of the focus error signal FE which has been nearly zero so far changes in such a valley-like form that the level becomes larger on the negative side and returns to the zero level again after reaching the negative peak, as shown in FIG. 12A.

As shown in FIG. 12B, the zero-crossing detection signal FZC output from the zero-crossing detector 6 falls when the level of the focus error signal FE goes away from the zero level on the negative side and passes the threshold value $-V_{TH}$, and rises when the level of the focus error signal FE later passes the threshold value $-V_{TH}$ just before returning to the zero level.

After executing step S32, the microcomputer 8 determines if the zero-crossing detection signal FZC has risen (step S33). When the zero-crossing detection signal FZC has risen, the kick pulse stop signal is generated (step S34). In accordance with the kick pulse stop signal, the jump pulse generator 13 stops generating the kick pulse. After generation of the kick pulse is stopped, the moment of inertia originated in response to the kick pulse causes the focus actuator 30 to keep moving to shift the focus position of the read light toward the recording surface of the second recording layer while slowing down its speed. During the movement of the focus actuator 30, the focus error signal FE returns to nearly the zero level, then reaches the unsettled area, after which the second layer will exercise an influence on the focus error signal FE as the focus actuator 30 moves further. That is, the level of the focus error signal FE changes in such a valley-like form that the level gradually becomes larger on the positive side due to the influence of the second layer, reaches a positive peak and then returns to the zero level. As shown in FIG. 12B, the zero-crossing detection signal FZC falls when the level of the focus error signal FE goes away from the zero level on the positive side and passes the threshold value $+V_{TH}$, and rises when the level of the focus error signal FE later passes the threshold value $+V_{TH}$ just before returning to the zero level.

After executing step S34, the microcomputer 8 determines if the zero-crossing detection signal FZC has fallen (step S35). When the zero-crossing detection signal FZC has fallen, the brake pulse generation signal of the voltage $-V_B$ corresponding to the ambient temperature T is generated (step S36). In accordance with the brake pulse generation signal of the voltage $-V_B$, the jump pulse generator 13 generates the brake pulse of the voltage $-V_B$ as shown in FIG. 12D. The adder 10 sends an added output whose level is the level of the voltage $-V_B$ of the brake pulse plus the held level output from the hold circuit 9, to the driver amplifier 17. As a result, the drive signal FD for stopping the movement of the focus position of the read light toward the target recording surface is supplied to the focus actuator 30, which in turn gradually reduces the displacement speed.

After executing step S36, the microcomputer 8 determines if the zero-crossing detection signal FZC has risen (step S37). When the zero-crossing detection signal FZC has risen, the microcomputer 8 generates the brake pulse stop signal (step S38). In accordance with the brake pulse stop signal, the jump pulse generator 13 stops generating the brake pulse. Then, the microcomputer 8 generates the servo close signal SC (step S39). The servo close signal SC switches the changeover switch 11a of the hold circuit 9 over to the equalizer 7 side and sets the ON/OFF switch 11b on. This causes the focus error signal FE to be supplied via the equalizer 7 and the adder 10 to the driver amplifier 17, after which the focus actuator 30 performs the normal focus servo operation to permit the focus position of the read light to follow up the target recording surface of the second layer, based on the focus error signal FE.

Figure 13:
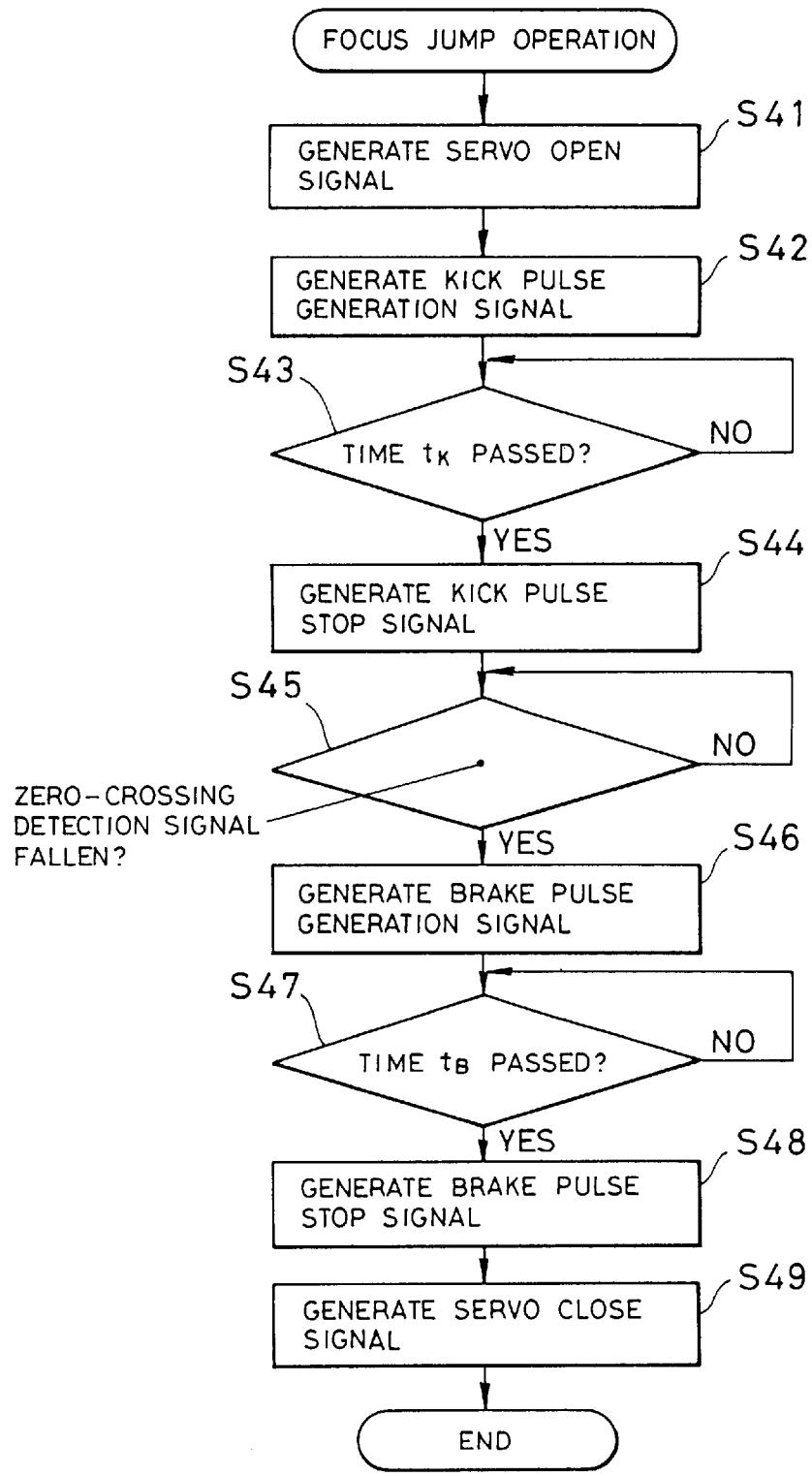
FIG. 13 is a flowchart illustrating a further focus jump operation.
Figures 14A, 14B, 14C, 14D:
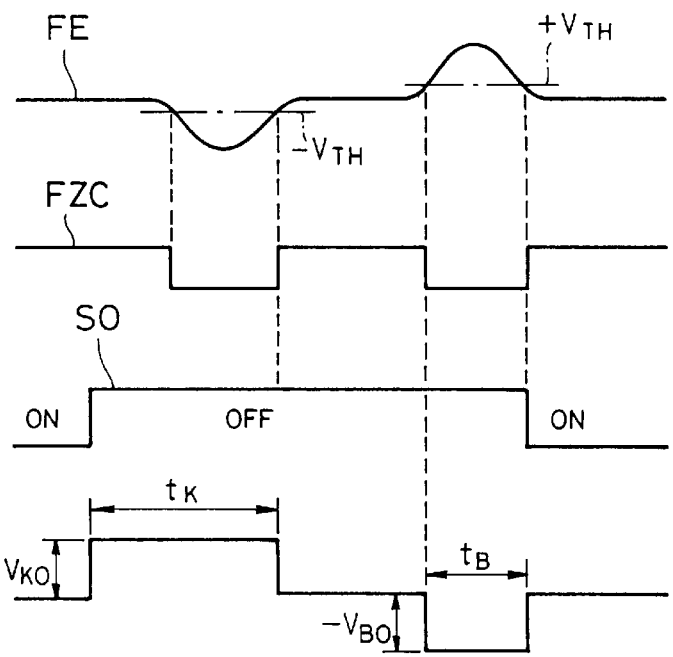
FIGS. 14A through 14D are waveform charts illustrating the focus jump operation in FIG. 13.

FIG. 13 illustrates a further focus jump operation, which partially overlaps the focus jump operations in FIGS. 7 and 11. A description will now be given of the focus jump operation in FIG. 13 including the overlapping portions. In this focus jump operation, first, the servo open signal SO is generated (step S41). The servo open signal changes the changeover switch 11a of the hold circuit 9 over to the capacitor 12 side and sets the ON/OFF switch 11b off. This renders the focus servo system off as shown in FIG. 14C. As a result, the storage level of the capacitor 12 of the hold circuit 9 or the level of the focus error signal immediately before the OFF state is held and is output to the adder 10. The microcomputer 8 generates the kick pulse generation signal (step S42). In accordance with the kick pulse generation signal, the jump pulse generator 13 generates the kick pulse of a given voltage $V_{KO}$ as shown in FIG. 14D to the adder 10. The adder 10 adds the level of the voltage $V_{KO}$ of the kick pulse and the held level output from the hold circuit 9 together and the drive signal FD corresponding to the addition result is supplied to the focus actuator 30 from the driver amplifier 17. During the generation period of the kick pulse, therefore, the actuator 30 is forcibly accelerated in a direction in which the focus position of read light is moved to a new target recording surface. Accordingly, as the focus position of the read light moves away from the followed-up recording surface, the level of the focus error signal FE which has been nearly zero so far changes in such a valley-like form that the level becomes larger on the negative side and returns to the zero level again after reaching the negative peak, as shown in FIG. 14A.

After executing step S42, the microcomputer 8 determines if the time $t_K$ has passed since the generation of the kick pulse generation signal (step S43). When the time $t_K$ has passed, the microcomputer 8 generates the kick pulse stop signal (step S44). In accordance with the kick pulse stop signal, the jump pulse generator 13 stops generating the kick pulse. After generation of the kick pulse is stopped, the moment of inertia originated in response to the kick pulse causes the focus actuator 30 to keep moving to shift the focus position of the read light toward the target recording surface of the second recording layer while slowing down its speed. During the movement of the focus actuator 30, the focus error signal FE returns to nearly the zero level, then reaches the unsettled area, after which the second layer will exercise an influence on the focus error signal FE as the focus actuator 30 moves further. That is, the level of the focus error signal FE changes in such a valley-like form that the level gradually becomes larger on the positive side due to the influence of the second layer, reaches a positive peak and then returns to the zero level. As shown in FIG. 14B, the zero-crossing detection signal FZC falls when the level of the focus error signal FE goes away from the zero level on the positive side and passes the threshold value $+V_{TH}$, and rises when the level of the focus error signal FE later passes the threshold value $+V_{TH}$ just before returning to the zero level.

After executing step S44, the microcomputer 8 determines if the zero-crossing detection signal FZC has fallen (step S45). When the zero-crossing detection signal FZC has fallen, the brake pulse generation signal is generated (step S46). In accordance with the brake pulse generation signal, the jump pulse generator 13 generates the brake pulse of a given voltage $-V_{BO}$ as shown in FIG. 14D. The adder 10 sends an added output whose level is the level of the voltage $-V_{BO}$ of the brake pulse plus the held level output from the hold circuit 9, to the driver amplifier 17. As a result, the drive signal FD for stopping the movement of the focus position of the read light toward the target recording surface is supplied to the focus actuator 30, which in turn gradually reduces the displacement speed.

After executing step S46, the microcomputer 8 determines if the time $t_B$ has passed since generation of the brake pulse generation signal (step S47). When the time $t_B$ has passed, the brake pulse stop signal is generated (step S48). In accordance with the brake pulse stop signal, the jump pulse generator 13 stops generating the brake pulse. Then, the microcomputer 8 generates the servo close signal SC (step S49). The servo close signal SC switches the changeover switch 11a of the hold circuit 9 over to the equalizer 7 side and sets the ON/OFF switch 11b on. This causes the focus error signal FE to be supplied to the driver amplifier 17 via the equalizer 7 and the adder 10, after which the focus actuator 30 performs the normal focus servo operation to permit the focus position of the read light to follow up the target recording surface of the second layer, based on the focus error signal FE. Here, $V_{KO}$, $V_{BO}$, $t_K$ and $t_B$ are parameters corresponding to the ambient temperature T.

Although the foregoing description of the embodiment has been given with reference to a double-layer optical disk, the invention is not limited to this particular type but may be adapted to a focus control apparatus in an apparatus which reproduces data from multilayer optical recording media including a multilayer optical disk having three or more layers.

While the zero-crossing detector 6 may detect when the level of the focus error signal FE passes the zero level, the focus error signal FE contains a noise component so that it is difficult to accurately detect when the level of the focus error signal FE passes the zero level in the focus jump operation. In this respect, the zero-crossing detector 6 detects the point when the level of the focus error signal FE passes the threshold value $\pm V_{TH}$ located slightly apart from the zero level.

According to this invention, as the focus jump operation is carried out based on the signal conditions for the drive signal which are set in accordance with the result of detection of the ambient temperature of the focus control apparatus, a focus jump on a multilayer optical recording medium can be implemented properly.

What is claimed is:

1. A focus control apparatus for a multilayer optical recording medium for implementing such focus jump control as to temporarily release a focus servo on one layer of a loaded multilayer optical recording medium, shift a focus position of read light on another target layer and then restart said focus servo on said another target layer, said apparatus comprising:

temperature detection means for detecting an ambient temperature; and control means for setting a drive signal condition according to a temperature detection output of said temperature detection means and moving said focus position of said read light under said set drive signal condition.

2. A focus control apparatus for a multilayer optical recording medium for generating an acceleration signal to start moving a focus position of read light and a deceleration signal to decelerate movement of said focus position of said read light, as drive signals for a focus actuator in order to execute a focus jump operation to irradiate said read light onto a recording medium having information recording surfaces on at least two layers formed perpendicular to a surface of said recording medium and loaded in a reproduction apparatus for reproducing data from said recording medium, and to shift said focus position of said read light from said recording surface of one of said at least two layers to said recording surface of another layer based on a focus error signal to be generated on a basis of return light of said read light from said recording medium, said focus control apparatus comprising:

temperature detection means for detecting an ambient temperature of said focus actuator; and setting means for setting signal conditions for said acceleration signal and said deceleration signal according to a temperature detection output of said temperature detection means.

3. The focus control apparatus according to claim 2, wherein said setting means sets signal amplitudes as signal conditions for said acceleration signal and said deceleration signal according to said temperature detection output of said temperature detection means.

4. The focus control apparatus according to claim 2, wherein said setting means sets signal amplitudes and signal sustain durations as signal conditions for said acceleration signal and said deceleration signal according to said temperature detection output of said temperature detection means.

5. The focus control apparatus according to claim 2, wherein said acceleration signal consists of a kick pulse and said deceleration signal consists of a brake pulse.

* * * * *